(12) United States Patent
Kromminga

(10) Patent No.: US 8,794,343 B2
(45) Date of Patent: Aug. 5, 2014

(54) HITCH ASSEMBLY FOR AN AGRICULTURAL IMPLEMENT

(75) Inventor: Gaylen James Kromminga, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/485,276

(22) Filed: May 31, 2012

(65) Prior Publication Data

US 2013/0319699 A1 Dec. 5, 2013

(51) Int. Cl.
*A01B 5/00* (2006.01)
*A01B 49/02* (2006.01)

(52) U.S. Cl.
USPC .......................................... 172/149

(58) Field of Classification Search
USPC ............ 56/149, 452, 328, 396, 467; 280/421; 172/149, 452, 328, 396, 467, 166, 456
See application file for complete search history.

(56) References Cited

U.S. PATENT DOCUMENTS

| 2,297,938 A * | 10/1942 | Briscoe ............................ 37/372 |
| 2,569,736 A | 10/1951 | Snyder |
| 2,699,637 A | 1/1955 | Nisbet |
| 2,723,129 A * | 11/1955 | Sprague ..................... 280/414.5 |
| 2,937,705 A | 5/1960 | Kirchner et al. |
| 3,266,816 A | 8/1966 | Peterson et al. |
| 3,408,149 A | 10/1968 | Lakes |
| 3,583,728 A | 6/1971 | Cornell |
| 3,738,682 A | 6/1973 | Ritter |
| 4,081,090 A | 3/1978 | Hopkins |
| 4,681,335 A | 7/1987 | Ledermann et al. |
| 4,809,786 A * | 3/1989 | Hoehn et al. .................. 172/316 |
| 4,932,476 A * | 6/1990 | Hoehn ........................... 172/430 |
| 5,094,300 A | 3/1992 | Jurgena |
| 5,147,095 A | 9/1992 | Duncan |
| 5,343,958 A | 9/1994 | Kromminga et al. |
| 5,409,069 A * | 4/1995 | Hake .............................. 172/400 |
| 5,413,182 A * | 5/1995 | Kromminga et al. ......... 172/776 |
| 5,485,797 A | 1/1996 | Green et al. |
| 5,809,914 A * | 9/1998 | Follmer .......................... 111/56 |
| 5,992,535 A * | 11/1999 | Bierl et al. ..................... 172/328 |
| 6,276,462 B1 * | 8/2001 | Dietrich, Sr. .................. 172/138 |
| 6,397,953 B1 * | 6/2002 | Ankenman ................ 172/445.1 |
| 6,679,339 B1 * | 1/2004 | Steinlage et al. ............. 172/395 |
| 7,513,316 B2 * | 4/2009 | Ruckle et al. .................. 172/677 |
| 7,712,544 B1 * | 5/2010 | Misenhelder et al. ........ 172/311 |
| 7,850,190 B2 * | 12/2010 | Ruckle et al. ................. 280/421 |
| 8,215,413 B2 * | 7/2012 | Friggstad ...................... 172/452 |
| 8,336,639 B2 * | 12/2012 | Palen ............................. 172/328 |
| 2008/0190628 A1 * | 8/2008 | Steinlage et al. ............. 172/166 |

FOREIGN PATENT DOCUMENTS

CN 2286266 7/1998

* cited by examiner

*Primary Examiner* — Árpád Fábián-Kovács
(74) *Attorney, Agent, or Firm* — Rebecca L. Henkel

(57) ABSTRACT

An agricultural implement is provided that includes a frame assembly. Moreover, the agricultural implement includes a rear hitch assembly coupled to the frame assembly. The rear hitch assembly includes a first arm, a second arm, and a hitch. The first arm and the second arm extend between the frame assembly and the hitch. The hitch is configured to be coupled to an auxiliary implement. Furthermore, the agricultural implement includes a ground engaging assembly which is coupled to the frame assembly, positioned between the first arm and the second arm, and includes a closing system.

20 Claims, 5 Drawing Sheets

HITCH ASSEMBLY FOR AN AGRICULTURAL IMPLEMENT

BACKGROUND

The invention relates generally to agricultural implements, and more particularly, to a hitch assembly configured to couple an agricultural implement to an auxiliary implement.

Agricultural implements are typically pulled through a field by a tow vehicle. The agricultural implements may direct tools to perform various functions in the field, such as fertilizing, opening, closing, cutting, and forming trenches. Certain agricultural implements may include a rear hitch assembly for towing an auxiliary implement (e.g., tanks for storing agricultural material) behind the agricultural implement. As the size of farms grow, larger tanks may be desirable to more efficiently deliver agricultural material (e.g., fertilizer, seeds, etc.). However, as the size of tanks increases the weight of the tanks also increases, thereby increasing stress applied to the hitch assembly and/or the agricultural implement. Accordingly, the hitch assembly may be designed to withstand stress applied by larger tanks. Unfortunately, such hitch assemblies may limit the number of tools attached to the agricultural implement, thereby decreasing the uniform distribution of agricultural material in a field.

BRIEF DESCRIPTION

In one embodiment, an agricultural implement includes a frame assembly. Moreover, the agricultural implement includes a rear hitch assembly coupled to the frame assembly. The rear hitch assembly includes a first arm, a second arm, and a hitch. The hitch is configured to be coupled to an auxiliary implement, and the first arm and second arm extend between the frame assembly and the hitch. Furthermore, the agricultural implement includes a ground engaging assembly which is coupled to the frame assembly, disposed between the first arm and the second arm, and includes a closing system.

In another embodiment, an agricultural implement includes a frame assembly having a first cross-bar and a second-cross bar. Moreover, the agricultural implement includes a plurality of closing systems coupled to the first cross-bar. In addition, the agricultural implement includes a y-shaped hitch assembly comprising a first arm, a second arm, and a hitch. The hitch is configured to be coupled to an auxiliary implement. Furthermore, the agricultural implement includes a ground engaging assembly having a closing system and being positioned between the first arm and second arm.

In another embodiment, an agricultural implement includes a frame assembly comprising a first cross-bar, a second cross-bar, a third cross-bar, and a cross-tube. Moreover, the agricultural implement includes a plurality of coulter discs coupled to the first cross-bar and the second cross-bar. In addition, the agricultural implement includes a plurality of closing systems coupled to the third cross-bar. Also, the agricultural implement includes a hitch assembly coupled to the second cross-bar and the cross-tube. The hitch assembly includes a first arm, a second arm, and a hitch. The hitch is configured to be coupled to an auxiliary implement. The first arm and the second arm extend between the frame assembly and the hitch, are pivotably coupled to the second cross-bar, and are slidably coupled to the cross-tube. Furthermore, the agricultural implement includes a ground engaging assembly coupled to the second cross-bar of the frame assembly. The ground engaging assembly is positioned between the first arm and the second arm and has a closing system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
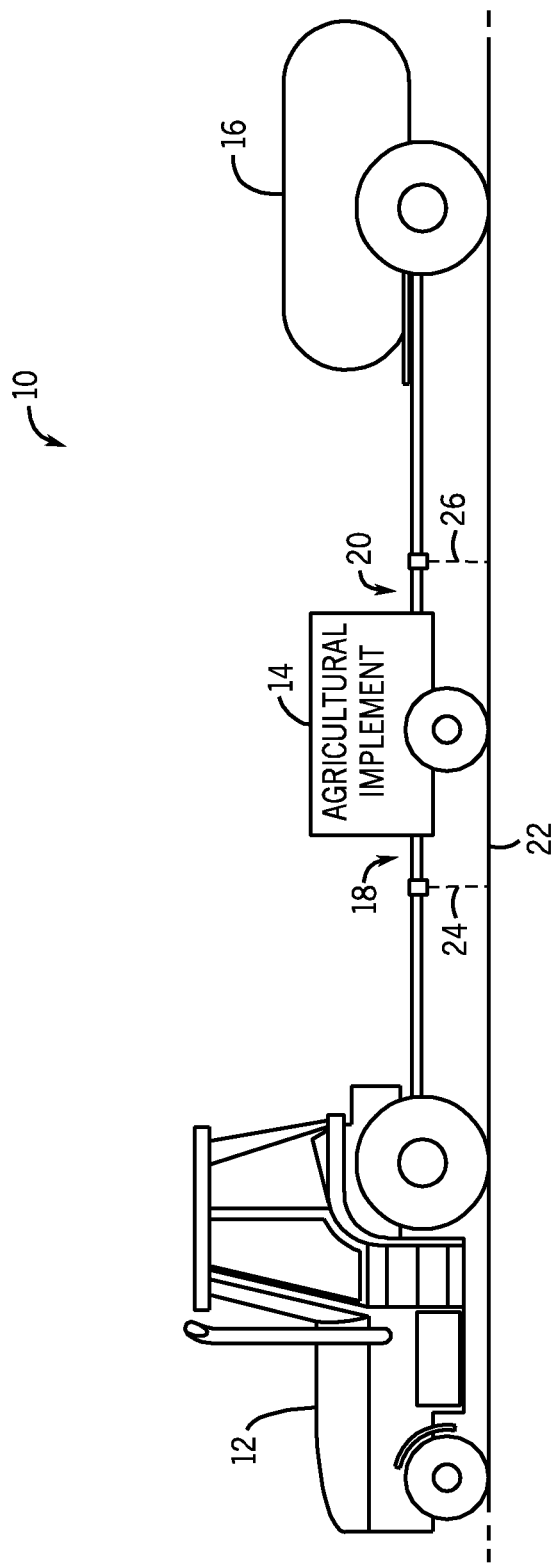
FIG. 1 is a side view of an embodiment of an agricultural system with an agricultural implement having a rear hitch assembly.

FIG. 1 is a side view of an embodiment of an agricultural system 10. The agricultural system 10 includes a tow vehicle 12, an agricultural implement 14, and a tank assembly 16. The tow vehicle 12 may be any vehicle suitable for towing the agricultural implement 14, such as a tractor, off-road vehicle, work vehicle, and so forth. Additionally, the agricultural implement 14 may be any implement suitable for agricultural use, such as a tiller implement, a fertilizer implement, or another agricultural implement. Furthermore, although the tank assembly 16 is illustrated, in other embodiments, any suitable auxiliary implement may be towed behind the agricultural implement 14.

The tow vehicle 12 is coupled to the agricultural implement 14 by a front hitch assembly 18. As illustrated, the agricultural implement 14 is coupled to the tank assembly 16 by a rear hitch assembly 20. The agricultural system 10 travels over a surface 22, such as the ground, a road, a field, or another surface. A distance 24 between a hitch of the front hitch assembly 18 and the surface 22 defines the ground clearance at the front of the agricultural implement 14. Additionally, a distance 26 between a hitch of the rear hitch assembly 20 and the surface 22 defines the ground clearance at the rear of the agricultural implement 14. In certain embodiments, changes in the distance 24 may result in an equivalent or opposite change in the distance 26. The change in the distance 26 may cause a force against the hitch of the tank assembly 16, thereby increasing stress on the tank assembly 16 or the agricultural implement 14. Furthermore, changes in the distance 24 may cause additional stress on the agricultural implement 14 if the distance 26 also changes. Accordingly, in certain embodiments, the rear hitch assembly 20 may be configured to maintain a substantially constant distance 26 during operation of the agricultural system 10 to reduce stress on the agricultural implement 14. Furthermore, as discussed in detail below, certain embodiments of the rear hitch assembly 20 may enable a ground engaging assembly to be positioned along the centerline of the agricultural implement 14 (e.g., between elements of the rear hitch assembly 20). By including a ground engaging assembly between elements of the rear hitch assembly 20, agricultural materials may be more uniformly distributed in a field.

Figure 2:
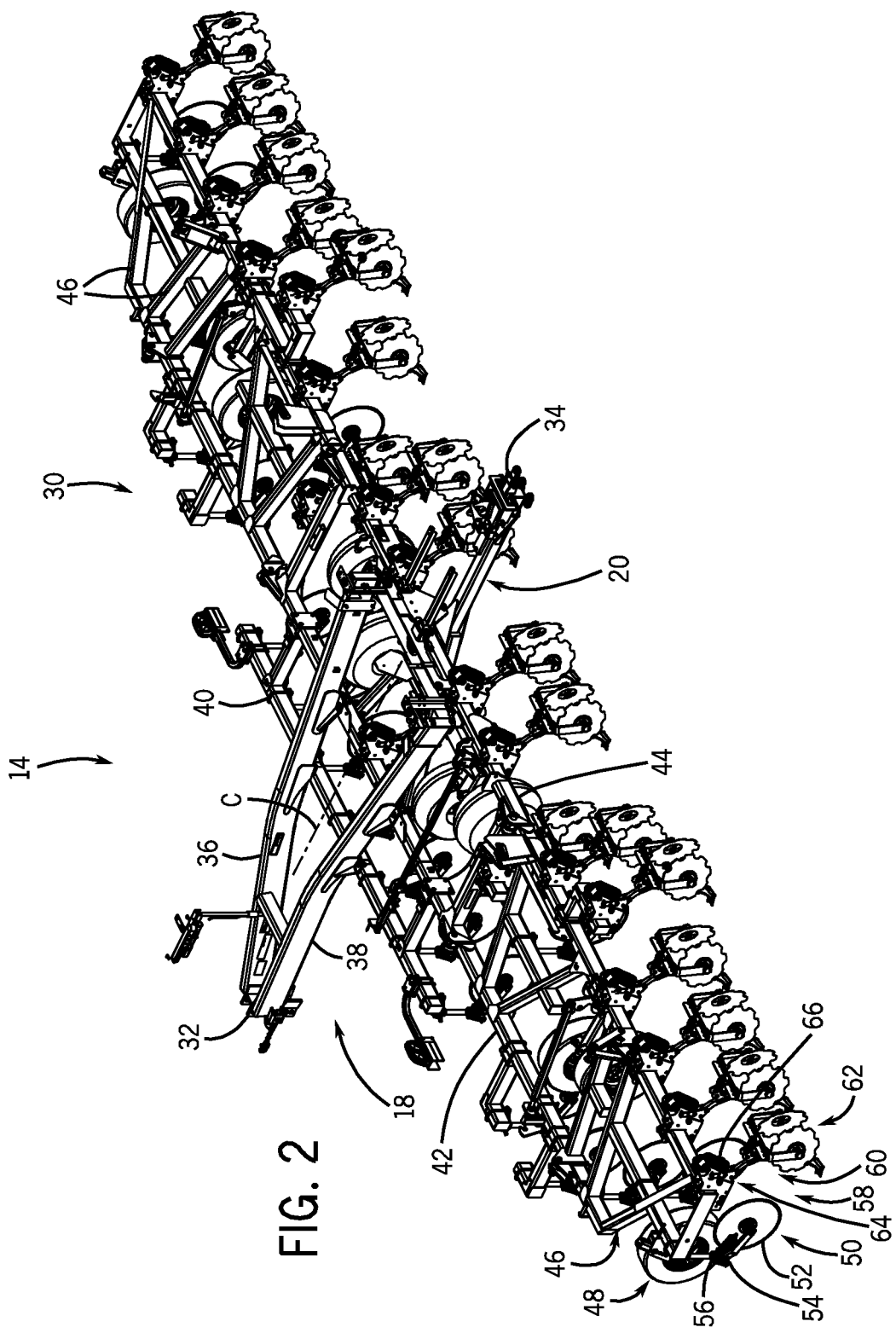
FIG. 2 is a perspective view of an embodiment of the agricultural implement of FIG. 1 having a ground engaging assembly disposed between arms of the rear hitch assembly.

FIG. 2 is a perspective view of an embodiment of the agricultural implement 14 of FIG. 1. For discussion, reference may be made to a centerline C of the agricultural implement 14. The illustrated embodiment of the implement 14 includes a frame assembly 30, the front hitch assembly 18, and the rear hitch assembly 20. The illustrated front hitch assembly 18 includes a hitch 32 configured to be coupled to the tow vehicle 12. Furthermore, the rear hitch assembly 20 includes a hitch 34 configured to be coupled to the tank assembly 16. As illustrated, the front hitch assembly 18 includes a first arm 36 and a second arm 38 arranged in a y-shape. However, other embodiments of the front hitch assembly 18 may include 1, 2, 3, or more arms arranged in a suitable arrangement. For example, some embodiments may include arms arranged in a u-shape, a-shape, or perpendicular configurations. Additionally, the first and second arms 36 and 38 of the front hitch assembly 18 are coupled to the frame assembly 30. In certain embodiments, the front hitch assembly 18 may be coupled to the frame assembly 30 using welded connections, bolts, brackets, or other suitable connections for coupling the front hitch assembly 18 either statically or rotatably to the frame assembly 30.

As illustrated, the frame assembly 30 includes a front cross-bar 40, a middle cross-bar 42, a rear cross-bar 44, and support members 46. In the illustrated embodiment, the cross-bars 40, 42, and 44 are configured in a parallel arrangement. Certain embodiments of the frame assembly 30 may include cross-bars oriented in a non-parallel arrangement and may include or exclude the support members 46. Additionally, some embodiments of the frame assembly may include more or fewer cross-bars. As illustrated, the support members 46 extend cross-wise to the cross-bars 40, 42, and 44 to provide structural integrity to the frame assembly 30.

The agricultural implement 14 includes multiple wheels 48. As discussed below, the wheels 48 enable adjustment of the height of the frame assembly. The illustrated embodiment of the agricultural implement 14 includes ten wheels 48, but other embodiments of the agricultural implement 14 may include 1, 2, 3, 4, 5, or more wheels. Further, the agricultural implement 14 includes field preparation assemblies 50 coupled to the front cross-bar 40 and to the middle cross-bar 42. The illustrated field preparation assemblies 50 include coulter discs 52, but certain field preparation assemblies 50 may include harrows (e.g., disc harrows) or other suitable tools for preparing a field for deposition of agricultural material (e.g., seeds, fertilizer) into soil. Additionally, each field preparation assembly 50 includes a pivoting joint 54 configured to facilitate rotation of the coulter disc 52 when a force is applied to the field preparation assembly 50. Moreover, each field preparation assembly 50 includes a spring 56 configured to bias the coulter disc 52 toward the soil surface. The illustrated embodiment of the agricultural implement 14 includes nineteen preparation assemblies 50, but other embodiments of the agricultural implement 14 may include 0, 1, 2, 3, 4, 5, or more preparation assemblies. Further, each of the preparation assemblies 50 may be coupled either to a cross-bar (e.g., cross-bars 40, 42, or 44) or to the support members 46 by one or more brackets, braces, bolts, welded connections, or another suitable connection.

The agricultural implement 14 includes multiple ground engaging assemblies 58 coupled to the rear cross-bar 44, and one ground engaging assembly 58 coupled to the middle cross-bar 42. As illustrated, the ground engaging assemblies 58 each include a ground engaging tool 60, a closing system 62, a pivot 64, and a spring 66. In some embodiments, the ground engaging tool 60 may be a hollow blade (e.g., knife) configured to engage soil and deliver a fertilizer (e.g., anhydrous ammonia) on or into the soil. In other embodiments, the ground engaging tool 60 may be a plowshare or other suitable tool for engaging soil. The closing systems 62 are configured to close an opening in the soil formed by the ground engagement tool 60, such as the disc sealers illustrated in the present embodiment.

The pivot 64 is configured to facilitate rotation of the ground engaging assembly 58 when the ground engaging tool 60 contacts an obstruction (e.g., rock) to protect to the ground engaging tool 60 and/or the agricultural implement 14. When the ground engaging tool 60 contacts an obstruction, the ground engaging assembly 58 rotates and compresses the spring 66. After the ground engaging tool 60 no longer contacts the obstruction, the spring 66 decompresses and returns the ground engaging assembly 58 to the position maintained before encountering the obstruction. While the illustrated embodiment of the agricultural implement 14 includes nineteen ground engaging assemblies 58, other embodiments of the agricultural implement 14 may include 1, 2, 3, 4, 5, or more ground engaging assemblies 58. Further, the ground engaging assemblies 58 may be coupled to the frame assembly 30 by one or more brackets, braces, bolts, welded connections, or another suitable connection.

In certain agricultural implements, a rear hitch assembly may occupy the central portion of the agricultural implement. Thus, such implements are unable to include a ground engaging assembly. Therefore, in such implements, a gap exists between the ground engaging assemblies coupled to the frame of the implement. Accordingly, the implements may not uniformly distribute agricultural materials in a field. As discussed in detail below, the rear hitch assembly 20 preserves space near a central portion of the agricultural implement 14 for disposing a ground engaging assembly 58. By positioning the ground engaging assembly 58 near the central portion of the agricultural implement 14, the agricultural implement 14 may provide a more uniform distribution of agricultural materials in a field, as compared to agricultural implements 14 that do not include such a ground engaging assembly 58.

Figure 3:
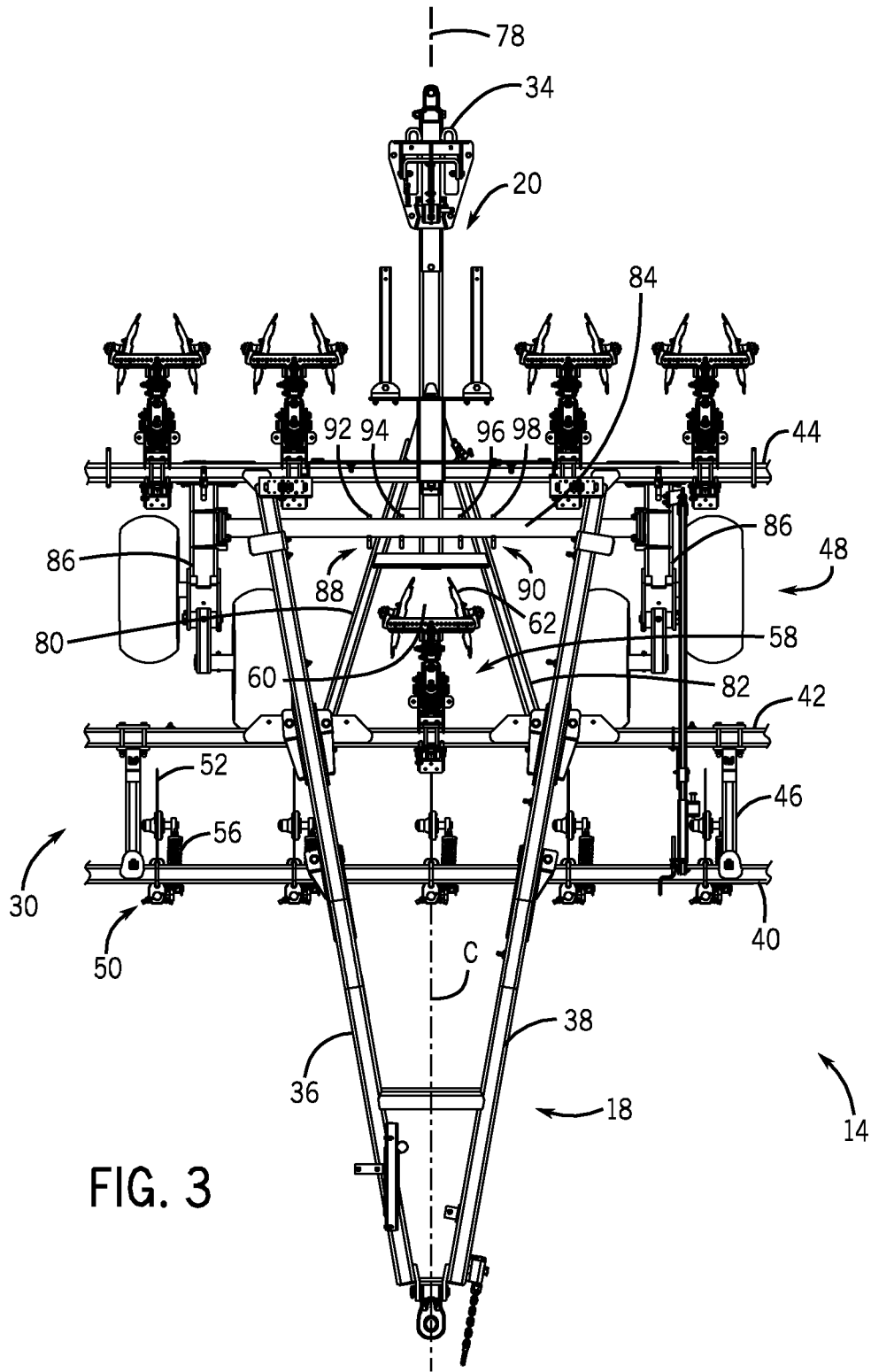
FIG. 3 is a top view of a portion of the agricultural implement of FIG. 2 having the ground engaging assembly disposed between the arms of the rear hitch assembly.

FIG. 3 is a top view of a portion of the agricultural implement 14 of FIG. 2 having the ground engaging assembly 58 disposed between arms of the rear hitch assembly 20. As previously discussed, the agricultural implement 14 includes the rear hitch assembly 20. The rear hitch assembly 20 extends rearwardly along a longitudinal axis 78 relative to the direction of travel, as illustrated. In some embodiments, the longitudinal axis 78 may be positioned along the centerline C of the agricultural implement 14. The rear hitch assembly 20 includes a first arm 80 and a second arm 82 arranged in a y-shape. As illustrated, a ground engaging assembly 58 is coupled to the middle cross-bar 42, and positioned between the first arm 80 and the second arm 82. Furthermore, as illustrated, the y-shape formed by the first arm 80 and the second arm 82 enables the ground engaging assembly 58 to be disposed along the centerline C of the implement 14.

As discussed in detail below, the first arm 80 and the second arm 82 are rotatably coupled to the middle cross-bar 42. The frame assembly 30 includes a cross-tube 84 coupled to structural supports 86 to facilitate the movement of the cross-tube 84 with the wheels 48. Furthermore, the structural supports 86 are configured to enable the height of the frame assembly 30 to be adjusted. For example, the structural supports 86 may be rotated upwardly and/or downwardly, thereby varying the distance between the wheels 48 and the frame assembly 30. As illustrated, the agricultural implement 14 includes bracket assemblies 88 and 90. Specifically, the bracket assembly 88 includes brackets 92 and 94. The bracket assembly 88 is configured to slidably couple the first arm 80 to the cross-tube 84. Similarly, the bracket assembly 90 includes brackets 96 and 98. The bracket assembly 90 is configured to slidably couple the second arm 82 to the cross-tube 84. As will be appreciated, by coupling the first arm 80 and the second arm 82 to the middle cross-bar 42 as illustrated, the ground engaging assembly 58 may be coupled to the middle cross-bar 42 and disposed along the centerline C of the agricultural implement 14. In embodiments unable to position a ground engaging tool 60 along the centerline C, a larger gap between the innermost ground engaging tools 60 exists. Accordingly, by positioning the ground engaging assembly 58 between the first arm 80 and the second arm 82, agricultural material may be more uniformly distributed in a field.

Figure 4:
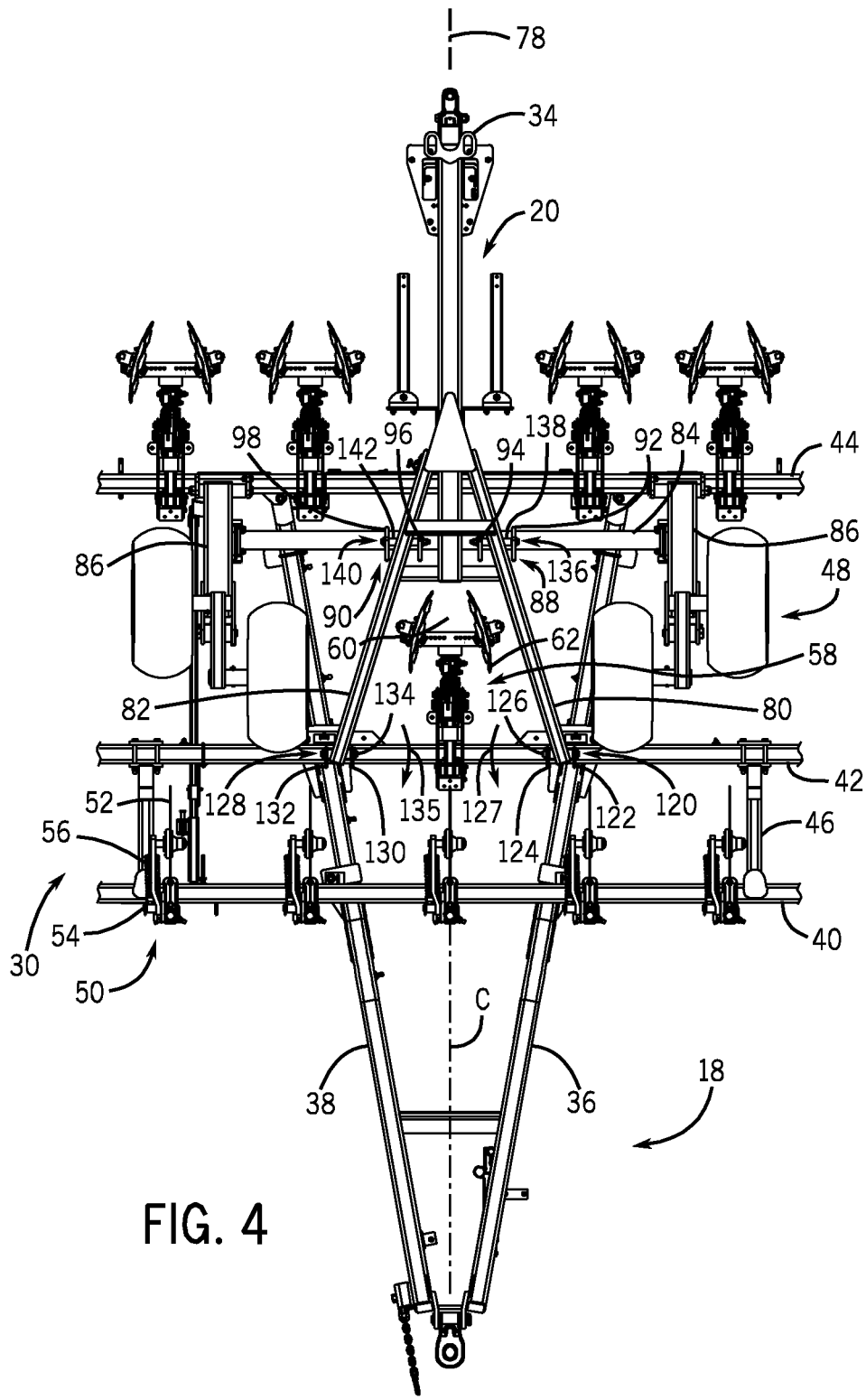
FIG. 4 is a bottom view of a portion of the agricultural implement of FIG. 2 having the ground engaging assembly disposed between the arms of the rear hitch assembly.

FIG. 4 is a bottom view of a portion of the agricultural implement of FIG. 2 having the ground engaging assembly 58 disposed between the first arm 80 and the second arm 82 of the rear hitch assembly 20. As illustrated, the rear hitch assembly 20 includes a first pin assembly 120 coupling the first arm 80 to the middle cross-bar 42. The first pin assembly 120 is coupled to brackets 122 and 124. Specifically, the first pin assembly 120 includes a pin 126 inserted through an opening in the first arm 80, and respective openings in the brackets 122 and 124 to pivotably secure the first arm 80 to the middle cross-bar 42. As will be appreciated, the first pin assembly 120 enables the first arm 80 to rotate about the pin 126 in a vertical direction 127. Likewise, the rear hitch assembly 20 includes a second pin assembly 128 coupling the second arm 82 to the middle cross-bar 42. Similar to the first pin assembly 120, the second pin assembly 128 is coupled to brackets 130 and 132 via a pin 134. Specifically, the pin 134 is inserted through an opening in the second arm 82, and respective openings in the brackets 130 and 132 to pivotably secure the second arm 82 to the middle cross-bar 42, and to enable the second arm 82 to rotate about the pin 134 in a vertical direction 135. Although the illustrated embodiments of the pin assemblies 120 and 128 include pins coupled to brackets facilitate rotation of the rear hitch assembly 20, some embodiments of the pin assemblies 120 and 128 may include other suitable connection (e.g., hinges, ball and socket joints, etc.) that enable rotation of the rear hitch assembly 20 in a suitable direction.

As discussed above, the bracket assemblies 88 and 90 couple to the cross-tube 84. A third pin assembly 136 includes a pin 138, and may include additional components (e.g., nuts, bolts, washers, clamps, etc.) suitable for securing the pin assembly 136 to the bracket assembly 88. As discussed below, the bracket assembly 88 and the pin assembly 136 together form a slidable connection between the first arm 80 and the cross-tube 84. The slidable connection is formed by inserting the pin 138 through an opening in the first arm 80, and respective openings in the brackets 92 and 94. A fourth pin assembly 140 includes a pin 142, and may include additional components, suitable for securing the fourth pin assembly 140 to the bracket assembly 90. Similar to the bracket assembly 88, the bracket assembly 90 and the pin assembly 140 together form a slidable connection between the second arm 82 and the cross-tube 84. The slidable connection is formed by inserting the pin 142 through an opening in the second arm 82, and respective openings in the bracket 96 and the bracket 98. For example, in certain embodiments, each of the openings is a slot configured to facilitate movement of the pins 138 and 142 relative to the brackets 92, 94, 96, and 98.

Figure 5:
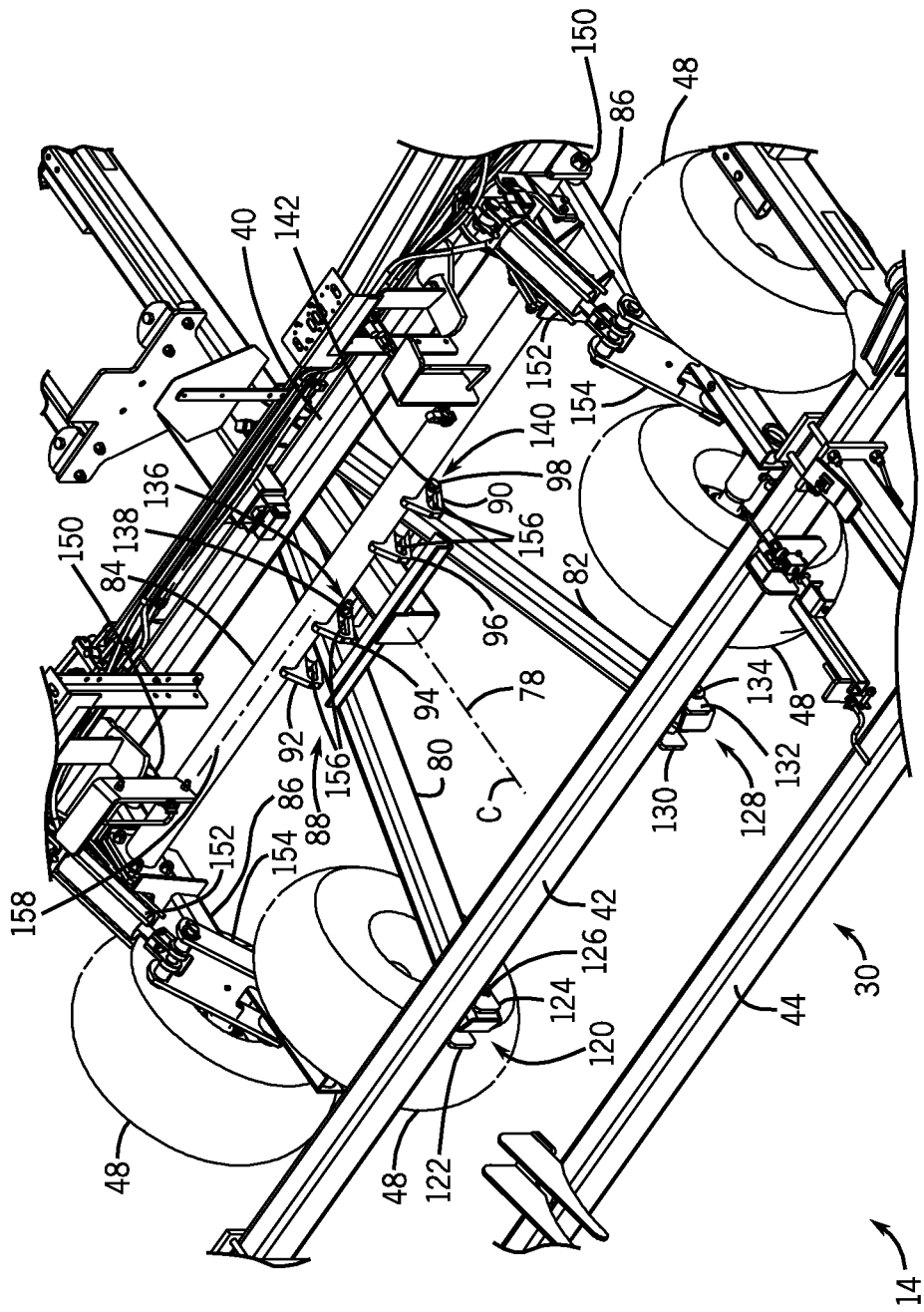
FIG. 5 is a perspective view of a portion of the agricultural implement of FIG. 2 having the ground engaging assembly disposed between the arms of the rear hitch assembly.

FIG. 5 is a perspective view of a portion of the agricultural implement 14 of FIG. 2 having the ground engaging assembly 58 disposed between the first arm 80 and the second arm 82 of the rear hitch assembly 20. The front hitch assembly 18, the field preparation assemblies 50, and the ground engagement assemblies 58 are omitted from the agricultural implement 14 for clarity. As previously discussed, adjusting a position of the wheels 48 varies the height of the frame assembly 30. Specifically, rotating the structural supports 86 varies the position of the wheels 48, thereby adjusting the height of the frame assembly 30. The structural supports 86 are coupled to the front cross-bar 40 by pin assemblies 150. As will be appreciated, the pin assemblies 150 facilitate rotation of the structural supports 86 relative to the frame assembly 30. To achieve rotation of the structural supports 86, the agricultural implement 14 includes actuators 152 and mounting brackets 154. In the illustrated embodiment, the actuators 152 are hydraulic actuators, while in other embodiments the actuators 152 may be another suitable type of actuator.

As the actuators 152 extend, the corresponding mounting brackets 154 rotate in a downward direction thereby inducing a corresponding structural support 86 to rotate in the downward direction. In other words, by extending the actuators 152, the actuators 152 drive the wheels 48 downwardly relative to the frame assembly 30, thereby raising the frame assembly 30 to a greater height above the surface 22. As will be appreciated, the actuators 152 may also be used to lower the frame assembly 30 relative to the surface 22 by retracting the actuators 152. When the actuators 152 are retracted, the mounting brackets 154 and the structural supports 86 rotate in an upward direction, thereby driving the wheels 48 upwardly, and lowering the frame assembly 30.

As illustrated, each of the brackets 92, 94, 96, and 98 includes a slot 156 into which the pin 138 or the pin 142 is inserted. Each slot 156 is wider than a diameter of the corresponding pin. Accordingly, the pins 138 and 142 may slide within the slots 156. For example, when the structural supports 86 rotate in a downward direction, the cross-tube 84 moves in a downward direction. As a further example, when the structural supports 86 rotate in an upward direction, the cross-tube 84 moves in an upward direction. Concurrently, the cross-tube 84 rotates about its axis 158. As the cross-tube 84 rotates about its axis 158, the brackets 92, 94, 96, and 98 also rotate about the axis 158 of the cross-tube 84. During the rotation of the cross-tube 84, the pins 138 and 142 slide within the slots 156 to enable the rear hitch assembly 20 to adjust relative to the height of the frame assembly 30. In other words, the combination of pin assemblies 120, 128, 136, and 140 with bracket assemblies 88 and 90 enable the rear hitch assembly 20 to rotate in relation to the frame assembly 30.

As previously discussed, the height of the frame assembly 30 may be changed due to height adjustment. Additionally or alternatively, operation on an uneven surface may change the height of the frame assembly 30. As discussed below, the rear hitch assembly 20 may compensate for the changes in the height of the agricultural implement 14 to maintain a substantially consistent distance 26 between the hitch 34 and the surface 22 to reduce stress on the agricultural implement 14. Specifically, the hitch 34 of the rear hitch assembly 20 is connected to the tank assembly 16 at the height of a connection for tank assembly 16 (e.g., distance 26). By allowing the rotation of the rear hitch assembly 20 in relation to the frame assembly 30 while concurrently coupling to the tank assembly 16 at the distance 26 determined by the tank assembly 16, the angle at which the rear hitch assembly 20 couples to the frame assembly 30 may vary. The variability of the angle between the rear hitch assembly 20 and the frame assembly 30 enables the agricultural implement 14 to compensate for changes to the height of the agricultural implement during operation.

By enabling the hitch 34 to maintain a substantially constant height during operation, the agricultural implement reduces stress (e.g., sheer) on the rear hitch assembly 20, the agricultural implement 14, and the tank assembly 16. Furthermore, because of the y-shaped configuration of the rear hitch assembly 20, the agricultural implement facilitates placement of a ground engaging assembly 58 along a centerline C of the agricultural implement 14. By including a ground engaging assembly 58 at a central location, the gap between the innermost ground engaging tools 60 on the middle cross-bar 42 is reduced around the central location. By reducing the gap around the central location of the agricultural implement 14, the agricultural implement 14 may more uniformly distribute an agricultural material in a field.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement comprising:
   a frame assembly;
   a front hitch assembly coupled to the frame assembly, wherein the front hitch assembly is configured to couple to a tow vehicle;
   a rear hitch assembly coupled to the frame assembly, and comprising a first arm, a second arm, and a hitch, wherein the first arm and the second arm extend between the frame assembly and the hitch, and the hitch is configured to be coupled to an auxiliary implement; and
   a ground engaging assembly coupled to the frame assembly and positioned between the first arm and the second arm, wherein the ground engaging assembly comprises a closing system.

2. The agricultural implement of claim 1, wherein the first and second arms form a y-shape.

3. The agricultural implement of claim 1, wherein the agricultural implement is configured to receive fertilizer from the auxiliary implement.

4. The agricultural implement of claim 3, wherein the ground engaging assembly comprises a ground engaging tool.

5. The agricultural implement of claim 4, wherein the ground engaging tool is configured to deposit the fertilizer into soil.

6. The agricultural implement of claim 5, wherein the fertilizer comprises anhydrous ammonia.

7. The agricultural implement of claim 1, comprising a coulter disc coupled to the frame assembly and positioned forward of the ground engaging assembly along a direction of travel.

8. The agricultural implement of claim 1, wherein the frame assembly comprises a cross-bar and a cross-tube, and wherein a first pin assembly and a second pin assembly couple the first and second arms of the rear hitch assembly to the cross-bar, and the first and second pin assemblies are configured to enable the rear hitch assembly to rotate in relation to the frame assembly.

9. The agricultural implement of claim 8, wherein the cross-tube comprises a bracket assembly, and wherein a third pin assembly couples the rear hitch assembly to the bracket assembly of the cross-tube, the third pin assembly being configured to slide within the bracket assembly to facilitate movement of the rear hitch assembly relative to the cross-tube.

10. An agricultural implement comprising:
    a frame assembly comprising:
      a first cross-bar; and
      a second cross-bar;
    a plurality of first closing systems coupled to the first cross-bar;
    a front hitch assembly coupled to the frame assembly, wherein the front hitch assembly is configured to couple to a tow vehicle;
    a y-shaped rear hitch assembly comprising a first arm, a second arm, and a hitch, wherein the hitch is configured to be coupled to an auxiliary implement; and
    a ground engaging assembly positioned between the first arm and the second arm, wherein the ground engaging assembly comprises a second closing system.

11. The agricultural implement of claim 10, wherein the ground engaging assembly is coupled to the second cross-bar.

12. The agricultural implement of claim 10, wherein the second closing system of the ground engaging assembly comprises a disc sealer.

13. The agricultural implement of claim 10, comprising a height adjustment system configured to lower the frame assembly to facilitate engagement of soil by the ground engaging assembly, and the height adjustment system is configured to raise the frame assembly to facilitate disengagement of the soil by the ground engaging assembly.

14. The agricultural implement of claim 13, wherein the height adjustment system comprises a hydraulic actuator.

15. The agricultural implement of claim 13, wherein the frame assembly and the y-shaped rear hitch assembly are pivotably coupled to one another to enable the hitch of the y-shaped hitch assembly to maintain a substantially constant distance from the soil as the frame assembly moves relative to the soil.

16. An agricultural implement comprising:
    a frame assembly comprising a first cross-bar, a second cross-bar, a third cross-bar, and a cross-tube;
    a plurality of coulter discs coupled to the first cross-bar and to the second cross-bar;
    a plurality of a first closing systems coupled to the third cross-bar;

a front hitch assembly coupled to the frame assembly, wherein the front hitch assembly is configured to couple to a tow vehicle;

a rear hitch assembly coupled to the second cross-bar and the cross-tube, the rear hitch assembly comprising a first arm, a second arm, and a hitch, wherein the first arm and the second arm extend between the frame assembly and the hitch, and the hitch is configured to be coupled to a auxiliary implement, and wherein the first arm and the second arm are pivotably coupled to the second cross-bar and slidably coupled to the cross-tube; and a ground engaging assembly coupled to the second cross-bar of the frame assembly, and positioned between the first arm and the second arm, wherein the ground engaging assembly comprises a second closing system.

17. The agricultural implement of claim 16, wherein the ground engaging assembly is aligned with a centerline of the rear hitch assembly.

18. The agricultural implement of claim 16, comprising an actuator configured to adjust the height of the frame assembly, and wherein the rear hitch assembly is configured to maintain a substantially constant distance from soil during actuation of the actuator.

19. The agricultural implement of claim 18, comprising:
a bracket assembly comprising at least one bracket, wherein the bracket assembly is configured to slidably couple the first arm or the second arm to the cross-tube, and the at least one bracket comprises a slot configured to receive a pin.

20. The agricultural implement of claim 19, wherein the slot is configured to enable the pin to slide therein during actuation of the actuator.

* * * * *